Patented May 1, 1945

2,375,083

UNITED STATES PATENT OFFICE 2,375,083

PREPARATION OF DISULPHIDES

Robert H. Cooper, Nitro, W. Va., assignor to Monsanto Chemical Company, St. Louis, Mo., a corporation of Delaware No Drawing. Application August 5, 1943, Serial No. 497,543

11 Claims. (Cl. 260—455)

This invention relates to an improved method of preparing disulphides from thio acids containing an —SH group in the thiocarboxyl radicle. Still more particularly this invention relates to improvements in the method of oxidizing to the corresponding disulphides, acids possessing the structure

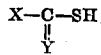

where X represents a member of the group consisting of nitrogen having the remaining valences satisfied by hydrogen and/or organic radicles, RO and RS where R is an organic ester forming group and Y is a doubly bonded sulphur or oxygen atom.

It is an object of this invention to provide an improved method of preparing disulphides from thio acids whereby a pure product is produced at lower cost. Another object is to provide a method by which chlorine gas or bromine vapor may be efficiently utilized as the oxidizing agent for the preparation.

The method in accordance with this invention comprises introducing gaseous chlorine or bromine vapor into the atmosphere above the surface of an aqueous medium containing the thio acid. Absorption of the gaseous oxidizing agent takes place at the liquid gas interface and it is desirable to continuously replenish the liquid at this interface with fresh solution. A very slight positive pressure of the gaseous oxidizing agent is sufficient.

The oxidizing agent can be added as rapidly as it is absorbed and the rate of absorption is in turn enhanced by effective stirring of the aqueous liquid phase whereby a fresh liquid surface is continuously presented to the oxidizing gas. However, the stirring should not be so violent as to splash liquid over the inlet tube for the oxidizing gas since diminished yields result. In addition, since the disulphide separates from the reaction medium as fast as it is formed, sufficient water should be present to enable the reaction mixture to be effectively stirred throughout the duration of the reaction. The optimum temperature for carrying out the reaction varies with the particular thio acid employed but in general good results are obtained by carrying out the oxidation within the range of about 0° C. to 50° C.

The present invention is valuable for the oxidation to disulphides of a variety of acids as for example the monothio and dithiocarbamic acids and the mono-, di- and trithio carbonic acids. Since the free acids of the type herein contemplated are relatively unstable substances, they are used in the form of their water soluble salts. Heretofore the oxidation of these compounds by chlorine or bromine has given low yields of disulphides as well as impure material. In the case of thiuram disulphides which are obtained by oxidation of the dithiocarbamates, the results are further improved by carrying out the oxidation in the presence of a buffer as for example sodium carbonate, borax or even sodium hydroxide.

The new process is illustrated in detail by the specific examples below but the invention is not limited thereto.

*Example I*

Into a glass or glass lined reaction vessel of suitable capacity fitted with an efficient stirrer, reflux condenser and other suitable accessories there was charged 450 parts by weight of a 19.0% aqueous solution of sodium dimethyl dithiocarbamate (substantially 0.6 molecular proportions), substantially 270 parts by weight of water and 12 parts by weight of 25% caustic soda and the solution cooled to 5° C. During efficient stirring of the liquid charge chlorine was fed into the vapor space above the liquid at the rate of 27 parts by weight per hour, the temperature being kept at 5–10° C. When particles of the disulphide no longer precipitated the chlorine feed was discontinued and the slurry made alkaline by the addition of a little caustic soda. The end point may also be determined by following the pH of the reaction with a suitable electrode system as for example an antimony electrode against a standard calomel half cell. The E. M. F. may be measured by a potentiometer. The end point is taken as the point on the pH curve where a sharp break occurs and the solution rapidly becomes acidic indicating the presence of free chlorine. The slurry was filtered and the separated solids washed until neutral and free of chlorides and then dried. A 97% yield of tetra methyl thiuram disulphide M. P. 150.5° C. was obtained. The experiment was repeated feeding the chlorine below the surface of the liquid. The yield was only 56.0%.

*Example II*

An aqueous solution of sodium cyclopenta methylene dithiocarbamate was prepared by adding substantially 40 parts by weight (substantially 0.52 molecular proportions) of carbon disulphide to a mixture at about 10° C. of 640 parts by weight of water, 84 parts by weight (substantially 0.52 molecular proportions) of 25% caustic soda and 44.7 parts by weight (substantially 0.50 molecular proportions) of 95% piperidine. The solution of the dithiocarbamate so prepared was cooled to 5° C. and chlorine introduced into the vapor space above the liquid keeping the temperature at 5-8° C. Thorough and rapid stirring of the charge was effected throughout the oxidation. An atmosphere of chlorine was maintained above the liquid until disulphide no longer precipitated. The slurry was then made slightly alkaline, filtered, washed and dried. A yield of 90.5% of di cycle penta methylene thiuram disulphide M. P. 117-121° C. was obtained.

Example III

An aqueous solution of sodium diamyl dithiocarbamate was prepared by adding at about 10° C. 40 parts by weight of carbon disulphide to a mixture of 950 parts by weight of water, 84 parts by weight of 25% caustic soda and 78.5 parts by weight (substantially 0.50 molecular proportions) of diamyl amine. The solution was cooled to 5° C. and during efficient stirring chlorine was introduced into the vapor space above the liquid as long as the disulphide continued to separate The temperature of the charge kept at about 5-8° C. Approximately 22.4 parts by weight or 0.63 atomic weight proportions of chlorine were added. The slurry was then made slightly alkaline, the oil layer dissolved in a suitable organic solvent as for example ether and the solvent extracts washed with water and dried. After removal of the solvent a 95.7% yield of tetra amyl thiuram disulphide, a yellow oil, was obtained.

Example IV

A solution of sodium diethyl dithiocarbamate was prepared by adding 20 parts by weight of carbon disulphide to a mixture of 580 parts by weight of water, 42 parts by weight of 25% caustic soda and 18.25 parts by weight (substantially 0.25 molecular proportions) of diethyl amine. The solution was cooled to about 5° C. and efficiently stirred while chlorine was introduced into the vapor space above the liquid. The temperature of the solution was kept at about 5-8° C. and chlorine fed in so long as the disulphide continued to precipitate. Substantially 0.3 atomic weight proportions of chlorine were required. The slurry was then made slightly alkaline and filtered. The separated solids were washed with water and dried. An 88% yield of tetra ethyl thiuram disulphide, a light yellow solid M. P. 67-71° C. was obtained.

Example V

A solution of the sodium salt of N-methyl cyclohexyl dithiocarbamic acid was prepared by adding 40 parts by weight of carbon disulphide to a mixture at about 10° C. of 760 parts by weight of water, 84 parts by weight of 25% caustic soda and 58.5 parts by weight (substantially 0.50 molecular proportions) of N-methyl cyclohexylamine. The solution was cooled to about 5° C. and efficiently stirred while chlorine was gradually introduced into the vapor space above the liquid. The temperature of the liquid was kept at about 5-8° C. and the chlorine run in until a precipitate no longer formed, approximately 0.61 atomic weight proportions of chlorine being required. The resinous precipitate was extracted from the reaction mixture by a water immiscible solvent as for example ether and the solvent removed. The product was further purified by recrystallizing from hot alcohol. A yellow solid M. P. 103-106° C. was obtained. Analysis for sulphur and nitrogen gave 33.6% sulphur and 7.52% nitrogen. The calculated values for sym. dimethyl dicyclohexyl thiuram disulphide are 34.0% sulphur and 7.40% nitrogen.

Example VI

Into a glass or glass lined container of suitable capacity fitted with an efficient stirrer, reflux condenser and other suitable accessories there was charged 720 parts by weight of water and 89 parts by weight (substantially 0.50 molecular proportions) of 89.5% potassium ethyl xanthate. The charge was cooled to about 10° C. and efficiently stirred while chlorine was gradually introduced into the vapor space above the liquid. Where desired higher temperatures may be used with equally good results. For example, a good yield of good quality product was obtained by carrying out the reaction at 30-40° C. About 0.5 atomic weight proportions of chlorine were sufficient to complete the reaction. The product separated as an oil light yellow in color. This was dissolved in ether or other suitable solvent and the ether extracts washed with water and dried. After removal of the solvent a substantially quantitative yield of ethyl xanthic disulphide remained. The oil solidified on cooling. Analysis for sulphur gave 52.4%, 52.7% sulphur. The calculated value for $C_6H_{10}O_2S_4$ is 52.9% sulphur.

Example VII

In a manner similar to that described in Example VI chlorine was introduced into the vapor space above a charge at 4-6° C. consisting of 890 parts by weight of water, 101 parts by weight (substantially 0.50 molecular proportion) of potassium amyl xanthate and 10 parts by weight of 25% caustic soda. Approximately 0.6 atomic weight proportion of chlorine was added and the reaction mixture was made slightly alkaline by the addition of a little caustic soda, the oil layer taken up in ether or other solvent and the solvent extracts washed with water and dried. After removal of the solvent amyl xanthic disulphide was obtained as an oil of light yellow color. The yield was about 86%. Analysis for sulphur gave 38.9% as compared to a calculated value of 39.2% sulphur for $C_{12}H_{22}O_2S_4$.

Example VIII

In a manner similar to that described in Example VI chlorine was introduced into the vapor space above a charge at 5-8° C. consisting of 400 parts by weight of water, 44 parts by weight (substantially 0.25 molecular proportion) of potassium isopropyl xanthate and 5 parts by weight of 25% caustic soda. After the introduction of approximately 0.34 atomic weight proportion of chlorine the reaction appeared to be complete and the slurry was then made slightly alkaline by the addition of a little caustic soda and filtered. The separated solids were washed and dried. The yield of isopropyl xanthic disulphide, a light yellow solid melting at 53-57° C., was about 90%.

Example IX

Substantially 20.4 parts by weight of potassium butyl trithiocarbonate (0.1 molecular proportion) was dissolved in 200 parts by weight of water in a glass or glass lined vessel fitted with an efficient stirrer, reflux condenser and other suitable accessories. Substantially 4 parts by weight of gaseous chlorine was gradually introduced into the space above the liquid while keeping the temperature of the latter at 28–33° C. The oil layer was drawn off and dissolved in ether or other solvent and dried over anhydrous sodium sulphate. The solvent was then removed leaving an orange colored oil believed to be butyl trithiocarbonic acid disulphide. The yield was approximately 85%.

Example X 14.5 parts by weight of Bender's salt

(substantially 0.1 molecular proportions) was dissolved in 125 parts by weight of water. Substantially 3.8 parts by weight of chlorine gas was gradually introduced into the vapor space above the solution during efficient stirring of the latter. The temperature of the charge was 27°–32° C. A little caustic soda solution sufficient to make the charge slightly alkaline was added and stirring continued for a short time after the addition of the chlorine. The oil layer was extracted with ether or other water immiscible solvent and the solvent extracts washed until neutral and dried over anhydrous sodium sulphate. After removal of the solvent a nearly colorless oil remained, believed to be carbethoxy disulphide

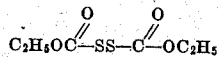

The yield was approximately 86%. Analysis for sulphur gave 30.3%, 30.4%. The calculated value for $C_6H_{10}O_4S_2$ is 30.47% sulphur.

Although preferred embodiments of the invention have been described, it will be appreciated that various modifications can be made without departing from the spirit of the invention or from the scope of the appended claims. The ingredients used, the proportions and conditions may be changed. The present invention is limited solely by the claims attached hereto as part of the present specification.

What is claimed is:

1. The method of oxidizing to the disulphide a thio acid salt selected from the group consisting of water soluble thiocarbonates and water soluble thiocarbamates which comprises introducing a gaseous oxidizing agent selected from the group consisting of chlorine and bromine into the atmosphere above the surface of an aqueous medium containing the thio acid salt.

2. The method of oxidizing to the disulphide a thio acid salt selected from the group consisting of water soluble thiocarbonates and water soluble thiocarbamates which comprises introducing gaseous chlorine into the atmosphere above the surface of an aqueous medium containing the thio acid salt.

3. The method of oxidizing a thiocarbamic acid salt to the corresponding disulphide which comprises introducing gaseous chlorine into the atmosphere above the surface of an aqueous medium containing the thiocarbamic acid salt.

4. The method of oxidizing a dithiocarbamic acid to the corresponding thiuram disulphide which comprises introducing gaseous chlorine into the atmosphere above the surface of an aqueous solution of a water soluble salt of the dithiocarbamic acid.

5. The method of oxidizing a dithiocarbamic acid derived from a secondary aliphatic amine, to the corresponding thiuram disulphide which comprises introducing gaseous chlorine into the atmosphere above the surface of an aqueous solution of a water soluble salt of the dithiocarbamic acid.

6. The method of oxidizing a dithiocarbamic acid derived from a secondary aliphatic amine, to the corresponding thiuram disulphide which comprises introducing gaseous chlorine into the atmosphere above the surface of an aqueous solution of a water soluble salt of the dithiocarbamic acid in the presence of a buffer.

7. The method of oxidizing dimethyl dithiocarbamic acid to tetra methyl thiuram disulphide which comprises introducing gaseous chlorine into the atmosphere above the surface of an aqueous solution of a water soluble salt of the said dithiocarbamic acid.

8. The method of oxidizing dimethyl dithiocarbamic acid to tetra methyl thiuram disulphide which comprises introducing gaseous chlorine into the atmosphere above the surface of an aqueous solution of an alkali metal salt of the said dithiocarbamic acid in the presence of a buffer.

9. The method of oxidizing a thiocarbonic acid to the corresponding disulphide which comprises introducing gaseous chlorine into the atmosphere above the surface of an aqueous solution of a water soluble salt of the said thiocarbonic acid.

10. The method of oxidizing a xanthate to the corresponding xanthic disulphide which comprises introducing gaseous chlorine into the atmosphere above the surface of an aqueous medium containing the xanthate.

11. The method of oxidizing an alkali metal ethyl xanthate to ethyl xanthic disulphide which comprises introducing gaseous chlorine into the atmosphere above the surface of an aqueous solution of the xanthate.

ROBERT H. COOPER.